United States Patent [19]

Wang

[11] Patent Number: 5,117,225

[45] Date of Patent: May 26, 1992

[54] COMPUTER DISPLAY SCREEN MONITORING SYSTEM

[75] Inventor: Bu-Chin Wang, Saratoga, Calif.

[73] Assignee: Summit Micro Design, Sunnyvale, Calif.

[21] Appl. No.: 346,141

[22] Filed: May 1, 1989

[51] Int. Cl.⁵ .................................... G09G 3/02
[52] U.S. Cl. ............................ 340/717; 340/825.05; 364/514
[58] Field of Search ............ 340/717, 825.05, 825.35, 340/717; 370/85.15, 73, 76, 124, 110.1; 358/181; 364/514

[56] References Cited

U.S. PATENT DOCUMENTS

| | | | |
|---|---|---|---|
| 3,633,166 | 1/1972 | Picard | 340/825.05 |
| 3,750,137 | 7/1973 | Wong et al. | 340/717 |
| 3,955,188 | 5/1976 | Viswanathan | 340/717 |
| 4,551,720 | 11/1985 | Levin | 340/717 |
| 4,715,032 | 12/1987 | Nilsson | 340/825.05 |

Primary Examiner—Alvin E. Oberley
Assistant Examiner—Doon Yue Chow
Attorney, Agent, or Firm—Fliesler, Dubb, Meyer & Lovejoy

[57] ABSTRACT

A computer display screen monitoring system comprising a master station and a plurality of user stations for displaying text and graphic data appearing on one display screen in the system on one or more other display screens in the system in real time. Multiplexers are provided in each of the stations in the system for selectively transferring video as well as audio signals (when provided) between the stations in response to function codes and addresses identifying the stations.

7 Claims, 5 Drawing Sheets

12

| | | | MASTER | ALL | | | |
|---|---|---|---|---|---|---|---|
| JAMES | MARY | JOHN | 4 | 5 | 6 | 7 | 8 |
| 9 | 10 | 11 | TOM | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |

FIG. 6

COMPUTER DISPLAY SCREEN MONITORING SYSTEM

BACKGROUND OF THE INVENTION

1. Field of the Invention

The present invention relates to computer display screen monitoring systems in general and in particular to a computer display screen monitoring system for displaying text and graphic data appearing on one display screen in the system on one or more other display screens in the system in real time.

2. Description of the Prior Art

Multiple computers, work stations and the like, each having display screens, are able to communicate with each other by being connected in a system commonly called a local area network, such as ethernet or arcnet. Typically, the machines in such systems are connected in parallel to a system data bus and have the capability to display text and graphic data appearing on one of the display screens in the system on one or more of the other display screens in the system. However, a disadvantage of such local area networks is that they typically do not have the capability of displaying such text and graphic data on more than one display screen in the system in real time. That is to say, in order to transfer text and graphic data from one display screen to another display screen, prior known systems have had to convert the data displayed on the screen of the sending machine to a form suitable for transmission over the system data bus and reconvert it in the receiving machine for display on the receiving machine's screen. This practice not only has the disadvantage of not providing multiple screen displays in real time, but also is time consuming and costly in terms of the software and hardware required in both the sending and receiving machines. A further disadvantage is that such prior known screen monitoring systems do not usually provide for the transmission of audio signals between stations in the system.

SUMMARY OF THE INVENTION

In view of the foregoing, principal objects of the present invention are a method and an apparatus for displaying text and graphic data appearing on one display screen in a system on one or more other display screens in the system in real time.

In a system according to the present invention there is provided a master station and a plurality of user stations which are linked together in series in a closed-loop fashion. In the master station there is provided a master computer and monitor and a control computer and monitor. In each of the user stations there is provided a user computer and monitor. In each of the master and user stations there is further provided a plurality of multiplexers and a decoding-latch circuit for selectively transmitting video signals between the stations. In an alternative embodiment of the present invention there is also provided in each of the master and user stations an audio circuit comprising a microphone, a speaker and decoding-latch means for switching the microphone and speaker into and out of the system to provide audio communications between the various stations.

The control computer in the master station controls the operations of the user stations in the system through a menu-driven software program. In practice, there are three modes of operation. The first mode is a "self-display" mode which allows the master station and each user station to operate independently, i.e. display the video signals from its own computer. The second mode is a "FROM-TO" mode which captures a screen display on one monitor and displays it on the screen of another monitor. The third mode is a "POLLING" mode which performs automatic capture of one user's screen, displays it on the master station screen for a preprogrammed time interval and then displays the next user's screen, in sequence, on the master station screen until the control computer changes the function.

Normally, the master station will control the operation of the system through the control computer. However, any user station can make a request to the master station for service through an interrupt request button on the user's panel. The master station can acknowledge the request by linking the requesting user station with the master station and provide the service requested. Voice communication between the user and the master stations is also provided in an alternative embodiment of the present invention in which audio transmitting and receiving devices are linked together in series in a closed-loop fashion and controlled by switching means responsive to function code, address code, and strobe control signals.

A principal advantage of the present invention is that the transmission of text and graphic data among the stations in the system is provided in real time and does not require the use of a conventional system data bus.

BRIEF DESCRIPTION OF THE DRAWINGS

The above and other objects, features and advantages of the present invention will become apparent from the following detailed description of the accompanying drawings, in which:

FIG. 5 is a block diagram of a REQUEST signal generating circuit according to the present invention; and FIG. 6 is a block diagram of a control computer monitor display screen in the master station according to the present invention.

DETAILED DESCRIPTION OF THE INVENTION

Figure 1:
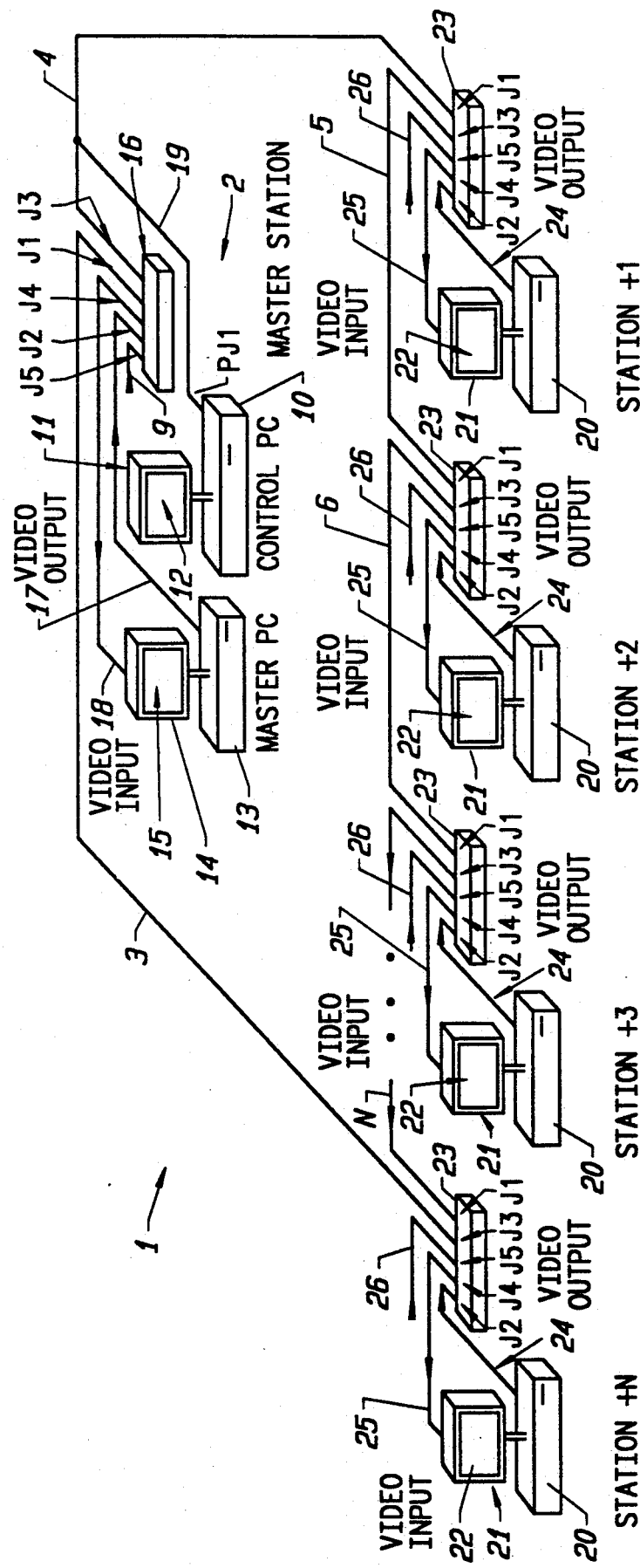
FIG. 1 is a diagram of the overall configuration of a computer screen monitoring system according to the present invention.

Referring to FIG. 1, there is provided in accordance with the present invention a computer display screen monitoring system designated generally as 1. In the system 1 there is provided a master station designated generally as 2 and a plurality of user stations designated generally as station 1, station 2, station 3, . . . station n. The master station 2 and the user stations 1—n are coupled in series in a closed-loop fashion by means of a plurality of signal buses 3, 4, 5, 6 . . . n. The designation n is used to mean that identical user stations may be added to or deleted from the system as required, as shown by the breaks in the bus n.

In the master station 2 there is provided a control computer 10 having a monitor 11 with a display screen 12, a master computer 13 having a monitor 14 with a display screen 15, and a station interface apparatus 16 having a plurality of signal ports designated J1, J2, J3, J4 and J5. A video signal output from the master computer 13 is coupled to port J2 of the apparatus 16 by means of a video bus 17. A video signal input in the monitor 14 is coupled to the port J4 of the apparatus 16 by means of a video signal bus 18. A data and control signal port of the control computer 10 is coupled to port J3 of the apparatus 16 by means of a data and control bus 19. Power is provided to port J5 of the apparatus 16 by means of a bus 9.

In each of the user stations 1—n there is provided a user computer 20 having a monitor 21 with a display screen 22 and a station interface apparatus 23 having a plurality of signal ports J1, J2, J3, J4 and J5. A video signal output from the computer 20 is coupled to port J2 of the apparatus 23 by means of a video signal bus 24. A video signal input in the monitor 21 is coupled to the port J4 of the apparatus 23 by means of a video signal bus 25. Power is provided to port J5 of the apparatus 23 by means of a bus 26.

The master station 2 is coupled to the user station 1 by means of the signal bus 4 which is coupled between port J3 of apparatus 16 and port J1 of apparatus 23 in user station 1. User station 2 is coupled to user station 1 by means of the signal bus 5 which is coupled between port J1 of apparatus 23 in user station 2 and port J3 in apparatus 23 in user station 1. User station 3 is coupled to user station 2 by means of the signal bus 6 which is coupled between port J1 of apparatus 23 in user station 3 and port J3 in apparatus 23 in user station 2. User station n is coupled to user station n−1, in this case user station 3, by means of the signal bus n which is coupled between port J1 of apparatus 23 in user station n and port J3 in apparatus 23 of user station n−1, in this case user station 3. User station n is coupled to master station 2 by means of the signal bus 3 which is coupled between port J3 of apparatus 23 in user station n and port J1 of apparatus 9 in master station 2.

The interface apparatus 16 in the master station 2 and the interface apparatus 23 in each of the user stations 1—n are substantially identical except for a few minor differences as will be described below.

Figure 2:
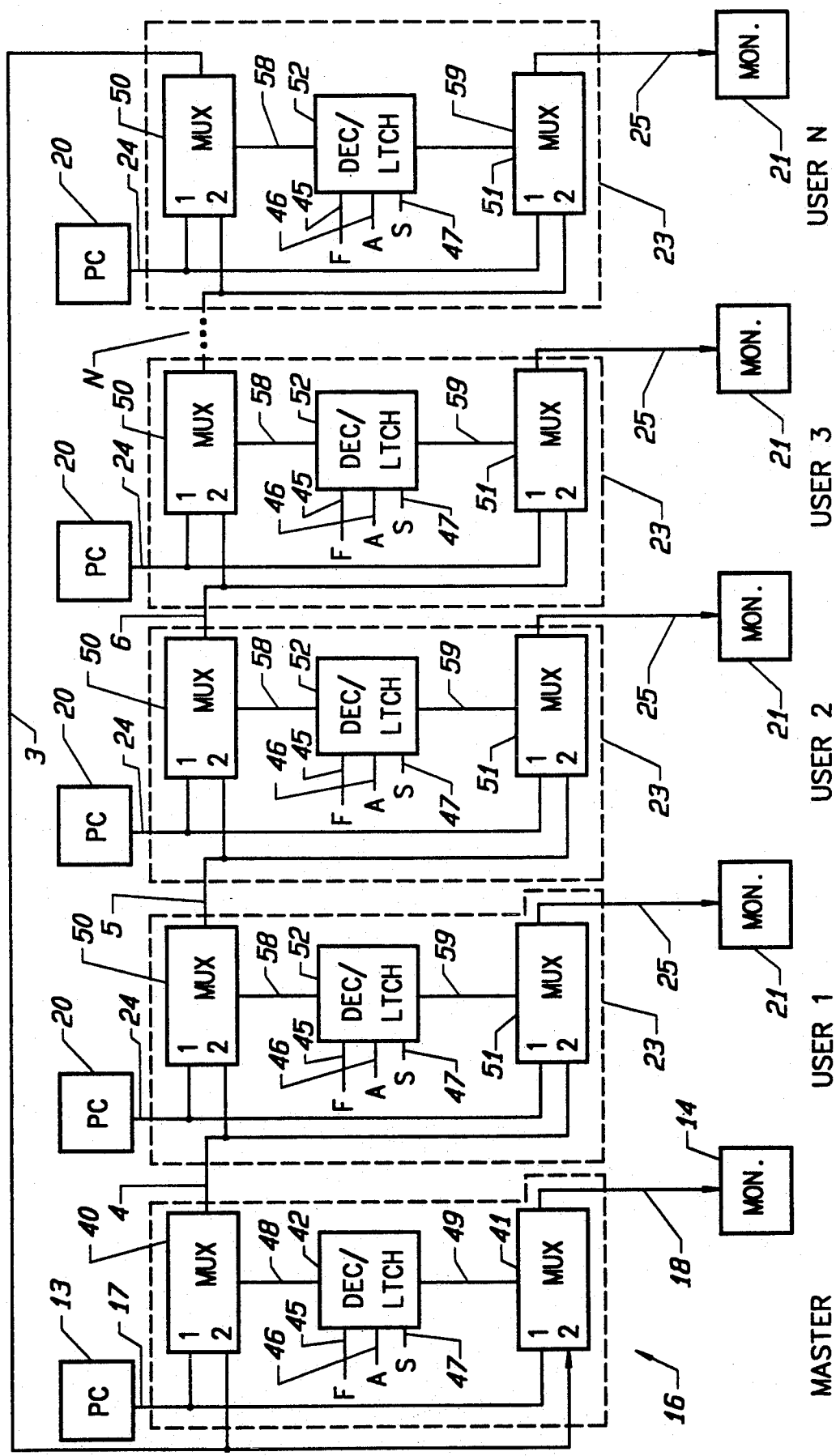
FIG. 2 is a generalized block diagram showing the manner in which multiplexers in each of the stations are interconnected for transmitting video signals from one station to another.

Referring to FIG. 2, there is provided in the interface apparatus 16 a pair of two-input multiplexers 40 and 41 and a function code and address decoding and latching circuit 42. In each of the multiplexers 40 and 41 there is provided a first input, a second input and an output. In the circuit 42 there is provided a first input for receiving a function code (F) on a bus 45, a second input for receiving an address code (A) on a bus 46, a third input for receiving a strobe signal (S) on a bus 47, a first output coupled to the multiplexer 40 by means of a line 48 and a second output coupled to the multiplexer 41 by means of a line 49 for controlling the multiplexers.

The video signal output from the master computer 13 is coupled to the first input of the multiplexers 40 and 41 by means of the video signal bus 17. The output of the multiplexer 41 is coupled to the monitor 14 by means of the video signal bus 18.

In the apparatus 23 of each of the user stations 1—n there is provided a pair of multiplexers 50 and 51, and a function code and address code decoding and latching circuit 52. Each of the multiplexers 50 and 51 have a first input, a second input and an output. In the decoding circuit 52 there is provided a first input for receiving a function code (F) on the bus 45, a second input for receiving an address code (A) on the bus 46, a third input for receiving a strobe signal (S) on the bus 47, a first output coupled to the multiplexer 50 by means of a line 58 and a second output coupled to the multiplexer 51 by means of a line 59.

The video output of the user computer 20 is coupled to the first input of the multiplexers 50 and 51 by means of the video signal bus 24. The output of the multiplexer 51 is coupled to the monitor 21 by means of the video signal bus 25.

To interconnect the master station 2 and the user stations 1—n in series in a closed-loop fashion as discussed above with respect to FIG. 1, the output of the multiplexer 40 in the apparatus 16 of the master station is coupled to the second input of the multiplexers 50 and 51 in the apparatus 23 of the user station 1 by means of the signal bus 4. The output of the multiplexer 50 in the apparatus 23 of user station 1 is coupled to the second input of the multiplexers 50 and 51 in the apparatus 23 of user station 2 by means of the signal bus 5. The output of the multiplexer 50 in the apparatus 23 of user station 2 is coupled to the second input of the multiplexers 50 and 51 in the user station 3 by means of the signal bus 6. The output of the multiplexer 50 in the apparatus 23 of user station 3 is coupled to the second input of the multiplexers 50 and 51 in the apparatus 23 of the next user station, in this case user station n, by means of the signal bus n. The output of the multiplexer 50 in the apparatus 23 of user station n is coupled to the second input of the multiplexers 40 and 41 in the apparatus 16 of the master station by means of the signal bus 3.

Figure 3:
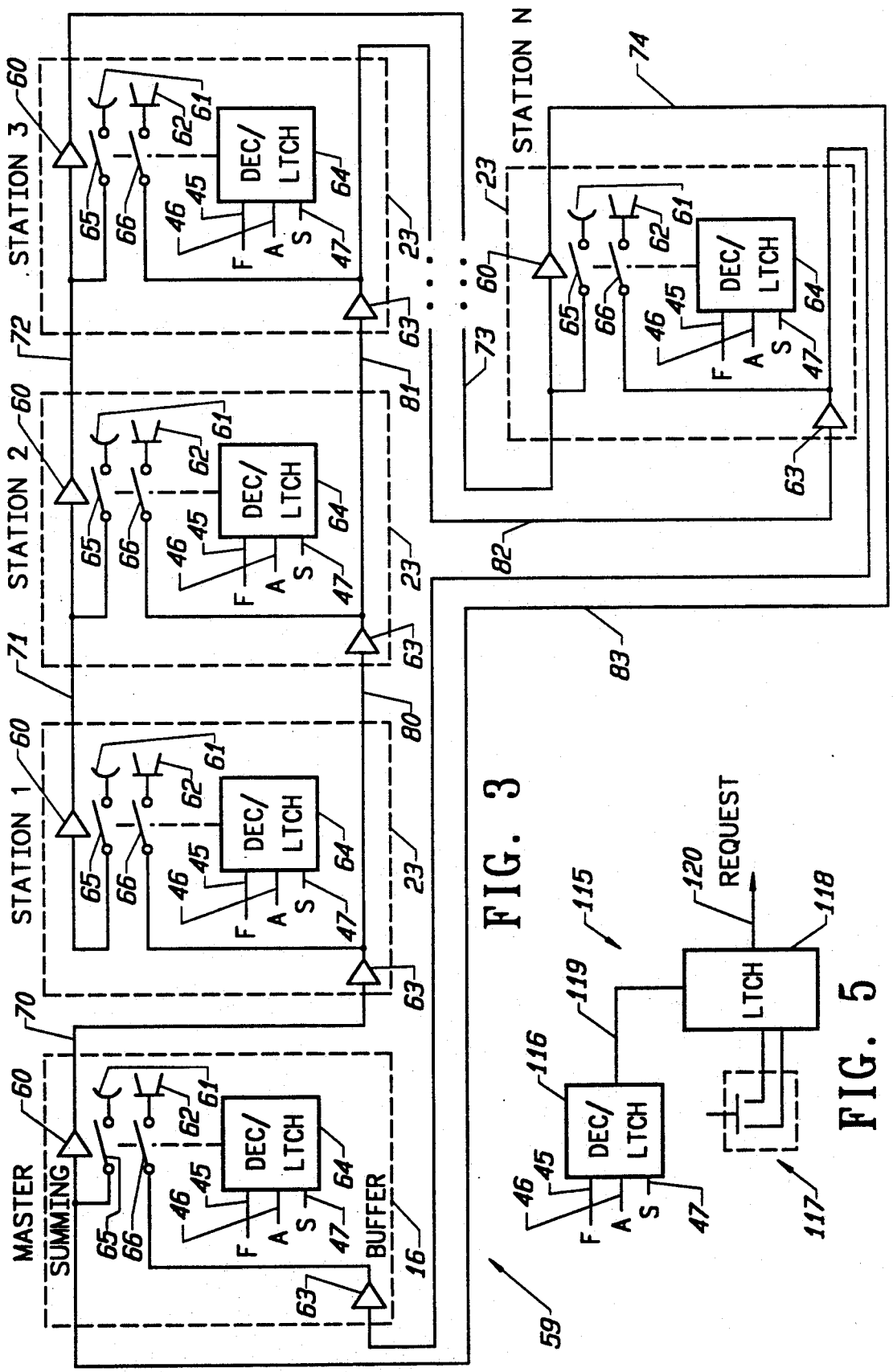
FIG. 3 is a generalized block diagram showing the manner in which the audio signal generating and receiving devices in each of the stations are interconnected in the system for transmitting audio signals from one station to another.

Referring to FIG. 3, there is provided for use in an alternative embodiment of the present invention an audio circuit designated generally as 59 for providing controlled audio communications between stations in the system. As shown in FIG. 3, there is provided in the apparatus 16 of the master station and in the apparatus 23 of each of the user stations 1—n a summing amplifier 60, a microphone 61, a speaker 62, an audio signal receiver buffer 63, a decoding and latching circuit 64 and a pair of switches 65 and 66 which are controlled by the circuit 64. In the circuit 64 there are three inputs which are coupled in parallel to the buses 45, 46 and 47 coupled to the inputs of the circuits 42 and 52 of FIG. 2.

The output of the summing amplifier 60 of the apparatus 16 of the master station is coupled to the input of the audio signal receiver buffer 63 in the apparatus 23 of user station 1 by means of an audio signal bus 70. The output of the summing amplifier 60 in the apparatus 23 of user station 1 is coupled to the input of the summing amplifier 60 in apparatus 23 of user station 2 by means of an audio signal bus 71. The output of the summing amplifier 60 in the apparatus 23 of user station 2 is coupled to the input of the amplifier 60 in the apparatus 23 of the user station 3 by means of an audio signal bus 72. The output of the amplifier 60 in the apparatus 23 of user station 3 is coupled to the input of the amplifier 60 in apparatus 23 of the next user station, in this case user station n, by means of an audio signal bus 73. Similarly, the output of amplifier 60 in apparatus 23 of user station n is coupled to the input of the summing amplifier 60 in the apparatus 9 of the master station by means of an audio signal bus 74.

The output of the receiver buffer 63 in the apparatus 23 of user station 1 is coupled to the input of the receiver buffer 63 in the apparatus 23 of user station 2 by means of an audio signal bus 80. The output of the buffer 63 in the apparatus 23 of user station 2 is coupled to the input of the buffer 63 in the apparatus 23 of user station 3 by means of an audio signal bus 81. The output of the receiver buffer 63 in the apparatus 23 of user station 3 is coupled to the input of the buffer 63 in the apparatus 23 of the next user station, in this case user station n, by means of an audio signal bus 82. The output of the receiver buffer 63 in the apparatus 23 of user station n is coupled to the input of the buffer 63 in the apparatus 16 of the master station by means of an audio signal bus 83.

Figure 4:
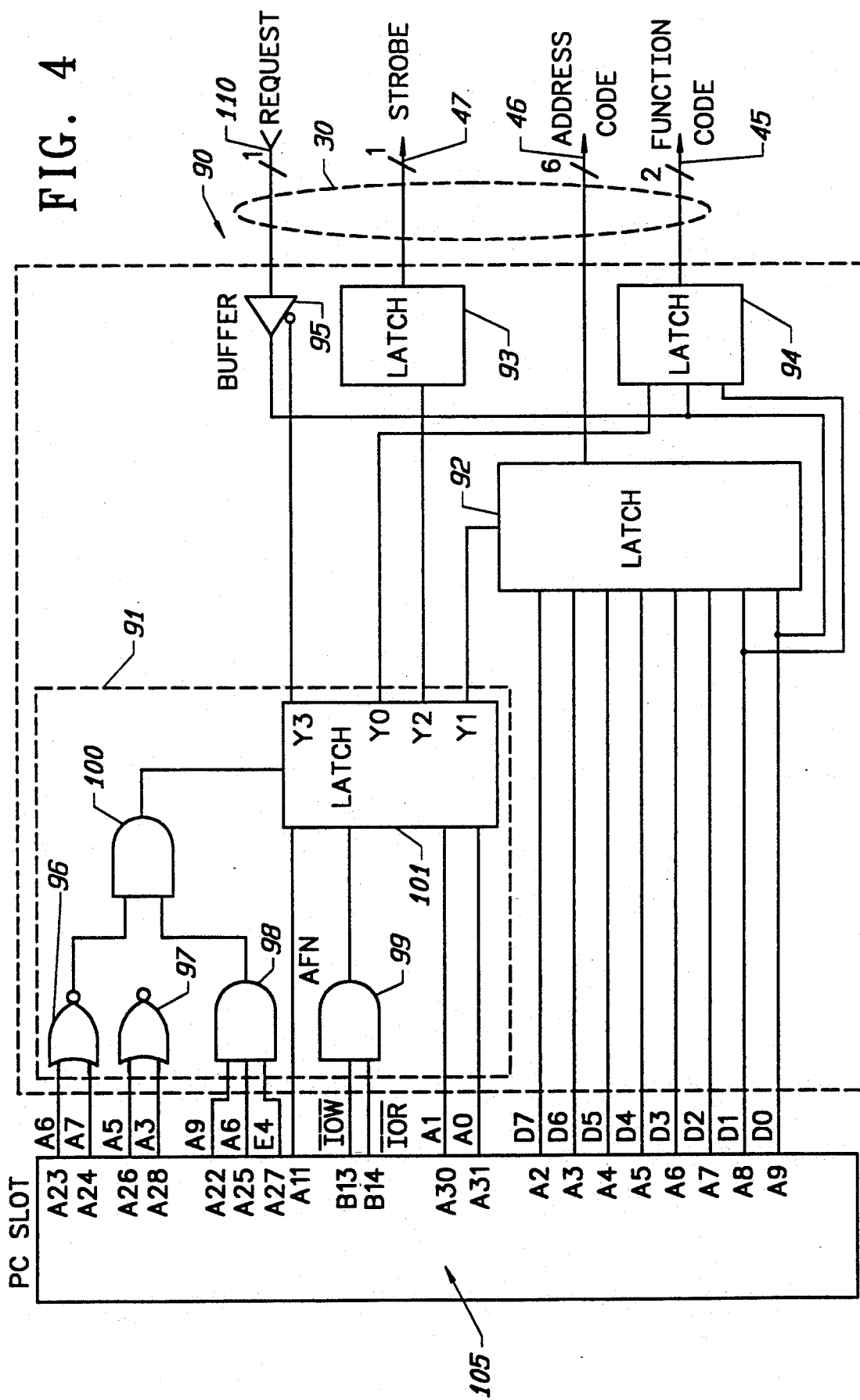
FIG. 4 is a block diagram of a control card according to the present invention.

Referring to FIG. 4, there is further provided in accordance with the present invention a control card designated generally as 90 for providing the function codes (F), address codes (A), and strobe control signals (S) on the buses 45, 46 and 47, respectively, for controlling the multiplexers and audio circuits (when used) in the system. The card 90, as will be seen, also receives REQUEST signals during the POLLING mode.

In the control card 90 there is provided a decoding circuit 91, a plurality of latches 92, 93 and 94 and a buffer 95. In the decoding circuit 91 there is provided a plurality of NOR gates 96 and 97, a plurality of AND gates 98, 99 and 100 and a latch 101.

The control card 90 is designed to be fitted in an available slot designated generally as 105 in the control computer 10 in the master station 2. Typically, each of the computers 10, 13 and 20 comprises an IBM personal computer or the like having slots for receiving input-/output interface cards having the following pin designations. Pins A2-A9 in the slot 105 are coupled to a corresponding number of data inputs D0-D7 of the latch 92. Data lines D1 and D0 are also coupled to the latch 94 while D0 is also coupled to latch 93 and the output of the buffer 95. Pins A23-A27 in the slot 105 are coupled to the gates 96-98 for addressing the control card 90. Pin A11 in the slot 105 is coupled to the latch 101 for providing an address enable signal. Pins B13 and B14 in the slot 105 are coupled to the latch 101 by means of the AND gate 99 for providing input/output write and input/output read control signals to the latch 101. Pins A30 and A31 in the slot 105 are coupled to the latch 101 for selecting one of the control card 90 outputs as will be described hereinafter. The pin designations cited above are typical for IBM personal computers. The input of the buffer 95 is coupled to a request signal line 120 for receiving REQUEST signals during POLLING as will be described below with respect to FIG. 5. The output of latch 93 is coupled to the strobe signal bus 47 for providing a strobe signal. The output of the latch 92 is coupled to the address code bus 46 for addressing the master and user stations. The output of latch 94 is coupled to the function code bus 45 for providing the function codes "SELF-DISPLAY", "FROM", "TO" and "POLLING".

Referring to FIG. 5, there is further provided in each of the user stations 1–n a REQUEST signal generating circuit designated generally as 115. In the circuit 115 there is provided a function code and address code decoding and latching circuit 116, a pushbutton 117, and a latch 118. The inputs of the circuit 116 are coupled in parallel to the buses 45, 46 and 47 and the output of the circuit 116 provides a latching signal to the latch 118 on a line 119 for providing a REQUEST signal on the line 120.

Referring to FIG. 6, the screen 12 of the monitor 11 in the control computer 10 of the master station 2 displays either a number associated with or the name of the person using each of the user stations in the system. Suitable software in the control computer is provided for this purpose.

In operation, the system of the present invention has three modes of operation: a "SELF-DISPLAY" mode, a "FROM-TO" mode and a "POLLING" mode.

Referring again to FIGS. 2 and 4, in the "SELF-DISPLAY" mode, the control computer 10 and control card 90 in the master station 2 are used to generate the function code "SELF-DISPLAY" on the bus 45 coupled to the decoding and latching circuit 42 in the master station 2 and the decoding and latching circuit 52 in each of the user stations 1–n. In response, the circuits 42 and 52 cause the multiplexers 41 and 51 to select their first inputs coupling the input buses 17 and 24 to the output buses 18 and 25 for displaying the video signals from their computers 13 and 20 on their monitors 14 and 21, respectively.

In the "FROM-TO" mode, the video signals appearing on the screen of the master station 2 or one of the user stations 1–n is transferred to and displayed on one or more of the other stations in the system. For example, assume that the video signals from the computer 13 in the master station 2 are to be displayed on the screens in the monitors 21 of user stations 2 and 3. In this case, the function code "FROM" is first generated on the bus 45, the address of the master station is generated on the bus 46 and a strobe signal is generated on the bus 47 by the control computer 10 and card 90. In response, the decoding and latching circuit 42 in the master station 2 latches the "FROM" signal. The latching of the "FROM" signal causes each of the multiplexers 40 and 41 in the master station 2 to couple their first input to their output such that the video signals from the master computer 13 are coupled by the multiplexer 40 to the bus 4 for transmission to the next station in the series and by the multiplexer 41 to the bus 18 for display on the screen 15 of the master station monitor 14. When this is done, an indication, such as a single block surrounding the word "master", appears on the screen 12 of the control computer monitor 11, as shown in FIG. 6.

The control computer 10 and card 90 are then used to generate in sequence the function code "TO" on the bus 45, the addresses of user stations 2 and 3 on the bus 46 and strobe signals on the bus 47. In each of the user stations 1–n the circuit 52 decodes and latches the function code "TO" causing the multiplexer 50 to couple its second input to its output such that bus 4 is coupled to bus 5 by multiplexer 50 in user station 1, bus 5 is coupled to bus 6 in user station 2, etc. In selected user stations 2 and 3, the circuit 52 decodes and latches the addresses for user stations 2 and 3 causing the multiplexer 51 therein to couple its second input to its output such that bus 5 is coupled to bus 25 and monitor 21 in user station 2 and bus 6 is coupled to bus 25 and monitor 21 in user station 3. In all the other non-selected user stations, the decoding and latching circuit 52 causes the multiplexer 51 to couple its first input to its output such that the video signals from its own computer 20 are displayed on the screen 22 of its own monitor 21. When this is done, an indication such as a double block surrounding the position of stations 2 and 3 appears on the screen 12 of the control computer monitor 11, as shown in FIG. 6.

Referring to FIG. 3, in a system having the audio circuit 59, the function codes "FROM" and "TO" and the address codes are decoded in the decoding and latching circuit 64 for closing the switches 65 and 66. When the switches 65 and 66 are closed, the microphones 61 and speakers 66 are coupled to their respective buses for providing two-way audio communications between the selected stations. In all of the other non-selected stations the switches 65 and 66 remain open. Thus, if as described in the example above, video signals from the master station are being sent to user stations 2 and 3, the decoding and latching circuit 64 in the master station and user stations 2 and 3 will be closed, thereby establishing two-way communications between said stations.

Referring to FIGS. 1 and 5, in the "POLLING" mode the master station 2 is used to poll the user stations for a REQUEST signal. In this mode the control computer 10 and card 90 are used to generate the function code "POLLING" and to sequentially address each of the user stations in the system. The polling rate is set by the operator of the master station.

In practice, the operator of a user station that wishes to communicate with the master station activates the pushbutton 117 at the user station. When that station is polled, a REQUEST signal is generated on the line 120 and an indication, such as a flashing symbol, appears on the control computer monitor screen 12 identifying the requesting station. Thereafter, the master station operator uses the "FROM-TO" mode to establish the video and, if available, the audio link as described above between the master and requesting user stations.

While a preferred embodiment of the present invention is described above, it is contemplated that various modifications may be made thereto without departing from the spirit and scope of the present invention. For example, while in a preferred embodiment of the present invention IBM personal computers are used, other computers may also be used. Accordingly, it is intended that the embodiment described be considered only as an illustration of the present invention and that the scope thereof should not be limited thereto but be determined by reference to the claims hereinafter provided.

What is claimed is:

1. A computer display screen monitoring system comprising:
    a plurality of stations; and
    means, including address decoding means and multiplexing means in each of said stations, for selectively transmitting a video signal from one of said stations to one or more other stations in said system in real time wherein said plurality of stations are coupled in series in a closed-loop fashion in a predetermined sequence, said multiplexing means in each of said stations comprises a first multiplexer for transmitting a video signal received by or generated in said station to the next station in said sequence and a second multiplexer for displaying a video signal received by or generated in said station on a display screen in said station, each of said stations has a predetermined address, said address decoding means in each of said stations comprises means for decoding said address of said station; and means coupling said address decoding means to said first and said second multiplexers for controlling said multiplexers.

2. A system according to claim 1 comprising means in each of said stations responsive to said decoding means for transmitting audio signals between selected ones of said stations.

3. A computer display screen monitoring system comprising:
    a plurality of stations coupled together in series in a closed-loop fashion, each of said stations having a predetermined address, a source of video signals, a monitor for displaying video signals, a first multiplexer having a first input, a second input and an output, a second multiplexer having a first input, a second input and an output, means for coupling said source of video signals to said first input in said first and said second multiplexers, means for coupling said output of said second multiplexer to said monitor, and decoding means responsive to a plurality of function codes and said predetermined address coupled to said first and said second multiplexers for controlling said multiplexers, and wherein said system further comprises:
    means for coupling said output of said first multiplexer in each one of said stations to said second input in said first and said second multiplexer in the next station in said series for selectively transferring video signals from said source in a selected first one of said stations in said series to said monitor in a selected one or more of the other stations in said series.

4. A system according to claim 3 wherein said source of video signals comprises a computer.

5. A system according to claim 3 wherein said plurality of stations comprises a master station and a plurality of user stations coupled in series and each of said stations comprises a microphone, an audio signal summing amplifying means having an input and an output, a speaker, an audio signal receiver buffer means having an input and an output, a switch means responsive to a control signal for selectively coupling said microphone to the input of said amplifying means and said speaker to the output of said buffer means, and means responsive to a predetermined function code and a predetermined address code for generating said control signal, and further comprising:
    means for coupling said output of said amplifying means in each of said user stations to said input of the amplifying means in the next user station in said series;
    means for coupling the output of said amplifying means in the last one of said user stations in said series to the input of said amplifying means in said master station;
    means for coupling the output of said amplifying means in said master station to said input of said buffer means in the first one of said user stations in said series;
    means for coupling the output of said buffer means in each of said user stations to the input of said buffer means in the next user station in said series; and
    means for coupling the output of the buffer means in the last one of said user stations in said series to the input of the buffer means in said master station.

6. A system according to claim 5 wherein said predetermined function code comprises a first function code "FROM" or a second function code "TO" and said predetermined address code identifies the station from or to which audio signals are to be transmitted.

7. A system according to claim 3 wherein said plurality of stations comprises a master station and a plurality of user stations and further comprising:
   means located in each of said user stations for generating a request signal;
   means located in said master station for polling all of said user stations for a request signal; and
   means located in said master station for indicating on said monitor in said master station the identity of each of said user stations which has generated a request signal.

* * * * *